Patented Aug. 28, 1934

1,971,997

UNITED STATES PATENT OFFICE 1,971,997

COMPOSITION FOR AND METHOD OF PRODUCING AIR-FOAM FOR FIRE EXTINGUISHING PURPOSES

John B. Treichel, Audubon, N. J., assignor to MacAndrews and Forbes Company, Camden, N. J., a corporation of New Jersey No Drawing. Application July 22, 1932, Serial No. 624,143

15 Claims. (Cl. 23—11)

My invention relates to a composition for and a method of producing foam for the purpose of extinguishing fires, and more particularly it relates to a novel and highly satisfactory composition for and method of producing air-foam for said purpose.

One object of my invention is to provide a foam-producing composition for use in extinguishing fires which is economical both from the standpoint of cost of ingredients and of application and which is characterized by reduction in weight and bulk of the materials which it is necessary to transport and store, as compared with the materials now generally employed in producing foam.

A further object of my invention is to furnish a composition for producing an air-foam for fire-fighting purposes, which composition when agitated with air in the presence of water, produces a much more durable and lasting air-foam than has heretofore been obtainable.

Another object of my invention is to provide a fire-fighting composition of the air-foam type by which it is possible to vary the consistency of the air-foam to meet the requirements of the particular fire encountered.

Still another object of my invention is to provide a composition which is applicable for use in fighting fires of all types including oil and other liquid fires, and fires on vertical or other solid surfaces where the foam must adhere where applied.

A still further object of my invention is to provide a method of producing air-foam at the location of the fire which is simple to employ and which does not require the use of complicated apparatus, the air-foam produced having the properties hereinabove set forth.

Other objects will be apparent from a consideration of the specification and claims.

The present invention is characterized by the use of primary or secondary licorice root extract in dry or liquid form with the oxide or hydroxide of calcium, strontium or barium, as an air-foam producing composition for fire-fighting purposes. The primary licorice root extract may be obtained from licorice root in any suitable manner, for example, by the extraction of ground licorice root with hot water. The secondary licorice root extract is obtained after the removal of the primary extract preferably by the treatment of licorice root with caustic soda under pressure, such a method being described in the patent to William W. Walker, No. 1,161,090 of November 23, 1915. Both the primary and secondary extract may be employed in dilute or concentrated liquid form, although from the standpoint of reduction in weight and bulk, the use of the dry powdered extracts is preferred.

Calcium oxide and hydroxide are particularly desirable because of their availability and cheapness. Since the hydroxide and oxide are equivalent and since the proportions employed are given herein as oxides, the term "oxide" will be employed throughout, it being understood that the hydrated oxides (hydroxides) are included within the term. Mixtures of the two extracts as well as mixtures of the oxides of barium, strontium and calcium may be employed in the composition.

The proportion of oxide to licorice extract is susceptible of wide variations, the proportion used depending on the characteristics of the air-foam desired. In general, the mixture will contain from 1% to 50% of oxide on the dry basis of the mixture, the remainder consisting of the primary or secondary licorice root extract, although in most cases the percentage of oxide in the composition will vary between 20% and 45%.

The air-foam of the present invention is particularly applicable for use in fires where there is an area of burning liquid such as oil, and where a vertical or other surface is aflame, such as a still. In the first case, the foam is applied to the surface of the burning area and it must be of such consistency that will allow it to flow over the area and blanket the flame. In the second case, it is necessary that the foam adhere without flow where applied, and, therefore, a foam is provided which is relatively stiff. In both cases, the foam must be sufficiently stable so that it will not wilt upon application and before it has functioned to blanket the fire. While other factors influence the properties of the foam as will hereinafter appear, the ratio of oxide to licorice extract determines in a large measure the consistency of the resulting foam. Where a stiff foam is desired, the ratio of oxide to extract is relatively large, and on the other hand where a more fluid foam is desired which will flow over a horizontal burning area, less oxide is employed.

The air-foam for fire-fighting purposes is produced by agitating the mixture of licorice extract and oxide with air in the presence of water, resulting in a solution or suspension. Any suitable agitating means may be employed for producing the air-foam; for example, air may be passed into a vessel containing the mixture in solution and the resulting foam sucked through a rotary pump such as a three-stage gear pump, or the mixture may be fed with air into the water stream from a hydrant, and the foam then passed through the rotary pump of a fire engine. The apparatus described in the patent to Clemens Wagener No. 1,821,914 of September 1, 1931 may also be successfully employed. These and other methods of producing the air-foam may be used at the fire and the foam as it emerges from the apparatus distributed over the fire. The consistency of the foam of any given mixture may be determined by the operator at the fire by control of the ratio of the mixture to water, the amount of air employed, and the amount of agitation to which the foam is subjected. The amount of air employed determines the volume of the foam obtained, while the amount of agitation determines the size of the bubbles in the air-foam, which in a degree governs the durability of the foam, since in general the smaller the bubbles the more durable will be the foam. The ratio of the mixture to water is also susceptible of considerable variation but in general the mixture is employed in percentages of from 3% to 15% (dry basis) with water in percentages from 97% to 85%. The volume of air to solution is dependent on the particular mixture employed and the amount of agitation used, and is determined by the operator, depending upon the characteristics of the foam desired. In general, 1 part by volume of solution of the composition is employed with from 5 parts to 15 parts by volume of air.

In a typical case, a foam particularly suitable for oil or other liquid fires is prepared by adding 4% of the dry composition (containing 25% calcium oxide and 75% licorice extract, primary or secondary) to 96% water and air is passed into the liquid. The air-containing fluid is then passed through a three-stage gear pump running at a speed which is sufficient to produce a relatively stable foam.

In a typical case, a foam particularly suitable for use on vertical or other solid surfaces where the foam must adhere where applied is prepared by adding 5% of the dry composition (containing 40% calcium oxide and 60% of licorice extract, primary or secondary) to 95% of water, and air passed into the liquid. The air-containing fluid is then passed through a three-stage gear pump running at a speed which is sufficient to produce a relatively stable foam.

Considerable modification is possible in the ratio oxide to licorice extract and in the proportion of water and air employed as well as in the methods of producing the air-foam, without departing from the essential features of my invention.

I claim:

1. Air-foam producing composition capable of forming an air-foam for fire extinguishing purposes with air in the presence of water comprising licorice extract as the foam producing compound and an oxide (hydroxide) selected from the following group—calcium oxide, barium oxide, strontium oxide, as the stabilizing agent for said foam.

2. Air-foam producing composition capable of forming an air-foam for fire extinguishing purposes with air in the presence of water comprising licorice extract as the foam producing compound and an oxide (hydroxide) selected from the following group—calcium oxide, barium oxide, strontium oxide, as the stabilizing agent for said foam,—the oxide being present in percentages from 1% to 50%.

3. Air-foam producing composition capable of forming an air-foam for fire extinguishing purposes with air in the presence of water comprising licorice extract as the foam producing compound and calcium oxide (hydroxide), as the stabilizing agent for said foam.

4. Air-foam producing composition capable of forming an air-foam for fire extinguishing purposes with air in the presence of water comprising licorice extract as the foam producing compound and calcium oxide (hydroxide), as the stabilizing agent for said foam the latter ingredient being present in percentages from 1% to 50%.

5. Air-foam producing composition capable of forming an air-foam for fire extinguishing purposes with air in the presence of water comprising licorice extract as the foam producing compound and an oxide (hydroxide) selected from the following group—calcium oxide, barium oxide, strontium oxide, as the stabilizing agent for said foam—the latter ingredient being present in percentages from 20% to 45%.

6. Air-foam producing composition capable of forming an air-foam for fire extinguishing purposes with air in the presence of water comprising licorice extract as the foam producing compound and an oxide (hydroxide) selected from the following group—calcium oxide, barium oxide, strontium oxide, as the stabilizing agent for said foam—the latter ingredient being present in a percentage in the neighborhood of 25%.

7. Air-foam producing composition capable of forming an air-foam for fire extinguishing purposes with air in the presence of water comprising licorice extract as the foam producing compound and an oxide (hydroxide) selected from the following group—calcium oxide, barium oxide, strontium oxide, as the stabilizing agent for said foam—the latter ingredient being present in a percentage in the neighborhood of 40%.

8. The method of producing an air-foam for fire extinguishing purposes which comprises dissolving or suspending in water a mixture containing licorice extract as the foam producing compound and an oxide (hydroxide) selected from the following group—calcium oxide, barium oxide, strontium oxide, as a stabilizing agent—and thereafter bringing the mixture into intimate contact with air and agitating the air-containing fluid to produce a relatively stable air-foam.

9. The method of producing an air-foam for fire extinguishing purposes which comprises dissolving or suspending in water a mixture containing licorice extract as the foam producing compound and calcium oxide (hydroxide), as a stabilizing agent and thereafter bringing the mixture into intimate contact with air and agitating the air-containing fluid to produce a relatively stable air-foam.

10. The method of producing an air-foam for fire extinguishing purposes which comprises dissolving or suspending in water a mixture containing licorice extract as the foam producing compound and an oxide (hydroxide) selected from the following group—calcium oxide, barium oxide, strontium oxide, as a stabilizing agent—the latter ingredient being present in proportions from 1% to 50%, and thereafter bringing the mixture into contact with air and agitating the air-containing fluid to produce a relatively stable air-foam.

11. The method of producing an air-foam for fire extinguishing purposes which comprises dissolving or suspending in water a mixture containing licorice extract as the foam producing compound and an oxide (hydroxide) selected from the following group—calcium oxide, barium oxide, strontium oxide, as a stabilizing agent—the latter ingredient being present in proportions from 20% to 45%, and thereafter bringing the mixture into contact with air and agitating the air-containing fluid to produce a relatively stable air-foam.

12. Relatively stable air-foam for fire extinguishing purposes comprising a water-solution or suspension of licorice extract as the foam producing compound and an oxide (hydroxide) selected from the following group—calcium oxide, barium oxide, strontium oxide, as the stabilizing agent for said foam—said air-foam containing relatively small bubbles of air surrounded by said solution or suspension.

13. Relatively stable air-foam for fire extinguishing purposes comprising a water-solution or suspension of licorice extract as the foam producing compound and calcium oxide (hydroxide), as the stabilizing agent for said foam said air-foam containing relatively small bubbles of air surrounded by said solution or suspension.

14. Relatively stable air-foam for fire extinguishing purposes comprising a water-solution or suspension of licorice extract as the foam producing compound and an oxide (hydroxide) selected from the following group—calcium oxide, barium oxide, strontium oxide, as the stabilizing agent for said foam—the latter ingredient being present in proportions from 1% to 50%, said air-foam containing relatively small bubbles of air surrounded by said solution or suspension.

15. Relatively stable air-foam for fire extinguishing purposes comprising a water-solution or suspension of licorice extract as the foam producing compound and an oxide (hydroxide) selected from the following group—calcium oxide, barium oxide, strontium oxide, as the stabilizing agent for said foam—the latter ingredient being present in proportions from 20% to 45%, said air-foam containing relatively small bubbles of air surrounded by said solution or suspension.

JOHN B. TREICHEL.